(12) United States Patent
Tamiya

(10) Patent No.: US 9,602,095 B2
(45) Date of Patent: Mar. 21, 2017

(54) MULTIPLEXER CIRCUIT, COMPUTER-READABLE RECORDING MEDIUM HAVING STORED THEREIN PROGRAM FOR DESIGNING MULTIPLEXER CIRCUIT, AND APPARATUS FOR DESIGNING MULTIPLEXER CIRCUIT

(71) Applicant: FUJITSU LIMITED, Kawasaki-shi, Kanagawa (JP)

(72) Inventor: Yutaka Tamiya, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 117 days.

(21) Appl. No.: 14/605,454

(22) Filed: Jan. 26, 2015

(65) Prior Publication Data

US 2015/0236684 A1    Aug. 20, 2015

(30) Foreign Application Priority Data

Feb. 18, 2014 (JP) .................. 2014-028545

(51) Int. Cl.
*G06F 17/50* (2006.01)
*H03K 17/00* (2006.01)
(Continued)

(52) U.S. Cl.
CPC ........... *H03K 17/005* (2013.01); *G06F 7/523* (2013.01); *G06F 7/722* (2013.01); *H03K 17/002* (2013.01);
(Continued)

(58) Field of Classification Search
CPC ..... G06F 7/523; G06F 7/722; H04N 21/4341; H03K 17/005; H03K 17/002;
(Continued)

(56) References Cited

U.S. PATENT DOCUMENTS 5,311,519 A     5/1994  Getzlaff et al.
7,545,928 B1 *  6/2009  Goh ...................... H04L 9/0625
                                                    380/28
(Continued)

FOREIGN PATENT DOCUMENTS

EP          2871589 A1 *  5/2015  ......... G06F 17/5027
JP          05-191291         7/1993
(Continued)

*Primary Examiner* — Helen Rossoshek
(74) *Attorney, Agent, or Firm* — Fujitsu Patent Center

(57) ABSTRACT

In a multiplexer circuit which loads N data segments (N is an integer of N<M) led by an arbitrary data segment from a first register storing M data segments (M is an integer equal to or larger than two) to a second register, an intermediate register is disposed between the first register and the second register. A first selection circuit between the first register and the intermediate register and a second selection circuit between the intermediate register and the second register are designed based on a value of L for minimizing a circuit amount of the first selection circuit and the second selection circuit. The value of L for minimizing the circuit amount is calculated based on values of the M and the N. Therefore, it is possible to reduce the circuit amount of the multiplexer circuit capable of performing data access with respect to large-volume data.

18 Claims, 13 Drawing Sheets

(51) Int. Cl.
*G06F 7/523* (2006.01)
*G06F 7/72* (2006.01)
*H04L 9/06* (2006.01)

(52) U.S. Cl.
CPC .......... *H03K 17/007* (2013.01); *H04L 9/0625* (2013.01); *H04L 2209/122* (2013.01); *H04L 2209/125* (2013.01)

(58) Field of Classification Search
CPC ............ H03K 17/007; H04L 2209/122; H04L 2209/125; H04L 9/0625
See application file for complete search history.

(56) References Cited

U.S. PATENT DOCUMENTS

| | | | | |
|---|---|---|---|---|
| 7,595,659 | B2* | 9/2009 | Vorbach | G06F 15/7867 326/38 |
| 9,280,629 | B2* | 3/2016 | Emirian | G06F 17/5027 |
| 2005/0138533 | A1* | 6/2005 | Le Bars | G11B 20/18 714/784 |
| 2007/0073528 | A1* | 3/2007 | Watt | G06F 17/5027 703/14 |
| 2009/0132630 | A1* | 5/2009 | Wiencke | G06F 7/5306 708/625 |
| 2015/0135147 | A1* | 5/2015 | Emirian | G06F 17/5027 716/105 |
| 2015/0318869 | A1* | 11/2015 | Hung | H03M 13/152 714/782 |
| 2016/0048623 | A1* | 2/2016 | Emirian | G06F 17/5027 716/105 |

FOREIGN PATENT DOCUMENTS

| | | |
|---|---|---|
| JP | 06-077792 | 3/1994 |
| JP | 07-066699 | 3/1995 |

* cited by examiner

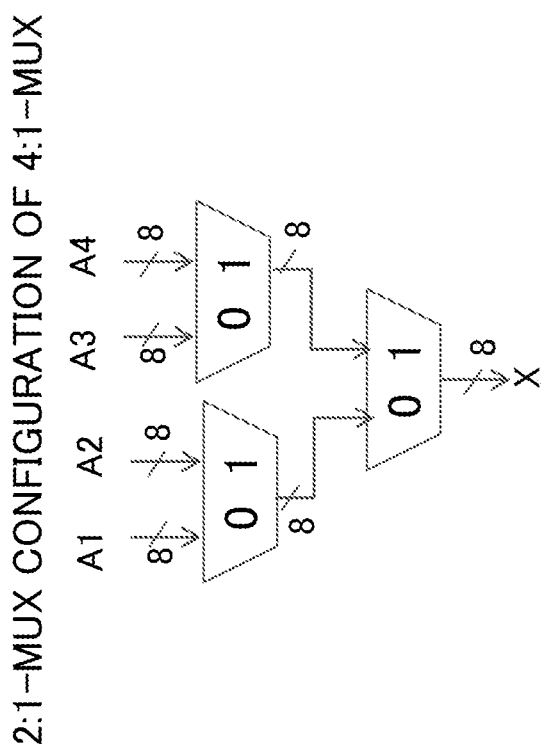

FIG. 12

DATA STRUCTURE OF TCP (IPv4) PACKET

| OFFSET | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|---|
| 0 | SOURCE PORT ||||||||||||||| | DESTINATION PORT |||||||||||||||| |
| 4 | SEQUENCE NUMBER |||||||||||||||||||||||||||||||| |
| 8 | ACKNOWLEDGE NUMBER |||||||||||||||||||||||||||||||| |
| 12 | HEADER LENGTH |||| RESERVED ||| NS | CWR | ECE | URG | ACK | PSH | RST | SYN | FIN | WINDOW SIZE |||||||||||||||| |
| 16 | CHECKSUM |||||||||||||||| | URGENT POINTER |||||||||||||||| |
| 20 | OPTION |||||||||||||||||||||||||| | PADDING ||||||
| ... | TCP DATA |||||||||||||||||||||||||||||||| |

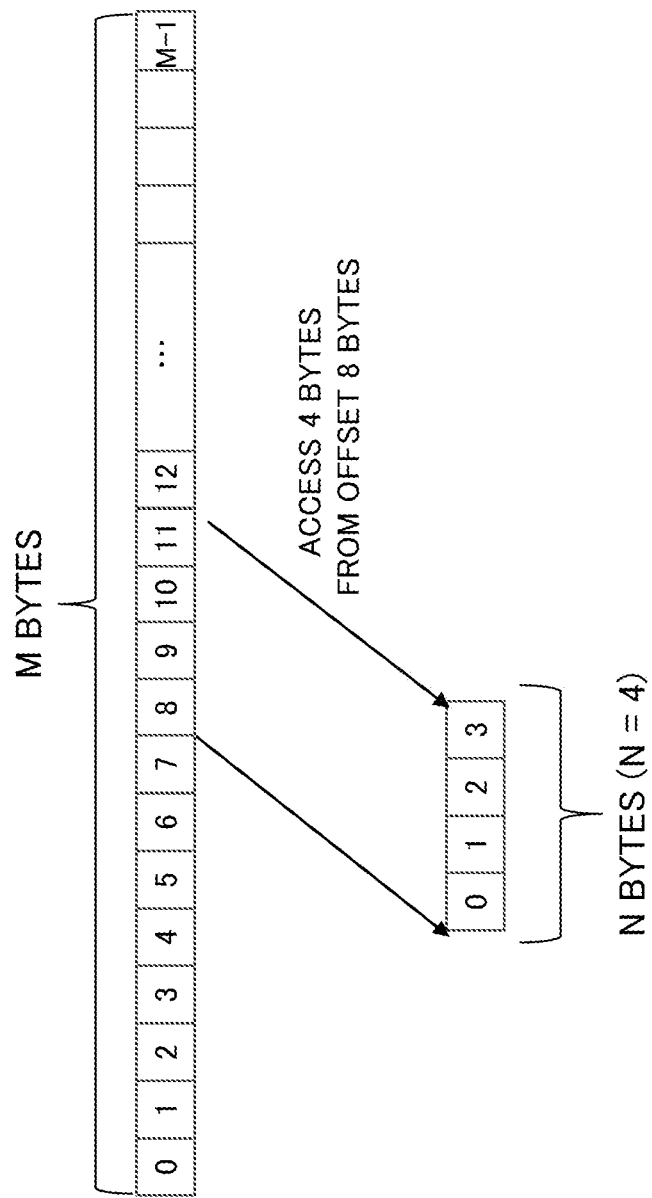

MULTIPLEXER CIRCUIT, COMPUTER-READABLE RECORDING MEDIUM HAVING STORED THEREIN PROGRAM FOR DESIGNING MULTIPLEXER CIRCUIT, AND APPARATUS FOR DESIGNING MULTIPLEXER CIRCUIT

CROSS-REFERENCE TO RELATED APPLICATION

This application is based upon and claims the benefit of priority of the prior Japanese Application No. 2014-028545 filed on Feb. 18, 2014 in Japan, the entire contents of which are hereby incorporated by reference.

FIELD

The present invention relates to a multiplexer circuit, a computer-readable recording medium having stored therein program for designing a multiplexer circuit, and an apparatus for designing multiplexer circuit.

BACKGROUND

In recent years, with the improvement (higher processing speed, higher density circuit, or the like) of performance of hardware associated with an information processing apparatus, the amount of data compatible with the hardware (for example, thousands to several gigabytes). Examples of such hardware includes, for example, a network packet processing circuit, a video data encoding/coding circuit, and a database processing circuit.

Also, with the development of semiconductor technology, large-volume data of several gigabytes can be stored in a single chip of large scale integration (LSI), such as an application specific integrated circuit (ASIC) or a field programmable gate array (FPGA).

As a circuit that maintains large-volume data in such an LSI, an on-chip memory or a register (or flip-flop (FF)) has been used.

Since the on-chip memory has limitation in the number of ports, there is also limitation in the number of processing circuits capable of accessing the on-chip memory simultaneously. Therefore, there is a need to study use of hardware in order to improve processing performance of the hardware.

On the other hand, since the register can have a large number of ports, a large number of processing circuits can access the register simultaneously. Therefore, the register is suitable to improve processing performance of the hardware.

On the other hand, large-volume generally has a data structure. For example, a transmission control protocol (TCP) (IPv4) packet has a data structure as illustrated in FIG. 12. Furthermore, a network packet or a video file even includes information on a data structure as its header.

In the case of processing large-volume data in an LSI or the like, for example, as illustrated in FIG. 13, entire data (M bytes) is stored in a register and access is frequently performed with respect to field data (N bytes ; N<M) arranged at a designated offset.

In this case, it is preferable to access the field data of N bytes from an arbitrary offset in data of M bytes at a time (that is, in one clock cycle) in order to realize flexible and rapid processing.

In FIG. 13, there is an example in which consecutive N-byte data segments (N=4) are accessed from offset 8 bytes in a M-byte data segment.

In order to realize random access with respect to large-volume data, a first register storing the large-volume data (data of an M-byte length) and a second register storing field data (N-byte data) to be processed by a processing circuit are connected to each other through a multiplexer circuit. The multiplexer circuit receives a control signal and switches connection relationship between the first register and the second register to perform loading of data from the first register to the second register or loading of data from the second register to the first register.

However, the circuit amount of the multiplexer circuit that enables random access with respect to the large-volume data increases considerably.

SUMMARY

According to the present invention, a multiplexer circuit loads, into a second register, N (N is an integer of N<M) data segments led by an arbitrary data segment from a first register storing M (M is an integer of two or more) data segments. Also, the multiplexer circuit includes an intermediate register, a first selection circuit, and a second selection circuit. The intermediate register temporarily stores L (L is an integer of N≤L<M) data segments including the N data segments among the M data segments, between the first register and the second register. The first selection circuit selectively loads the L data segments among the M data segments from the first register to the intermediate register. The second selection circuit selectively loads the N data segments among the L data segments from the intermediate register to the second register. The first selection circuit and the second selection circuit are designed based on a value of L that minimizes a circuit amount of the first selection circuit and the second selection circuit, calculated according to values of the M and the N.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a view illustrating a 4:1 multiplexer configured by 2:1 multiplexers;

FIG. 12 is a view illustrating a data structure of a TCP (IPv4) packet; and

FIG. 13 is a view illustrating an example of access of N-byte data (N<M) in data of an M-byte length.

DESCRIPTION OF EMBODIMENT(S)

Figures 1A, 1B:
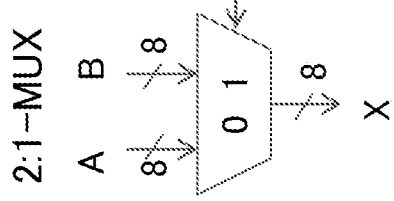
FIG. 1A is a view illustrating a basic configuration of a 2:1 multiplexer.
FIG. 1B is a view illustrating a truth table of the 2:1 multiplexer illustrated in FIG. 1A.

Hereinafter, a multiplexer circuit, a computer-readable recording medium having stored therein program for designing a multiplexer circuit, and an apparatus for designing multiplexer circuit according to embodiments of the present disclosure will be described in detail with reference to the drawings. The embodiments described below are merely exemplary and it is not intended to exclude various modifications and applications of technologies which are not explicitly described in the embodiments. That is, the present embodiments can be modified in various ways without departing from the spirit thereof. Moreover, the respective drawings are not intended to include the constituent components illustrated in the drawings only, but may include other functions and the like. The embodiments can be appropriately combined to the extent that their processing details do not contradict each other.

[1] Configuration of Multiplexer Circuit

First, a multiplexer circuit that is a design target in the present embodiment will be described with reference to FIGS. 1A, 1B and 2 to 4. Hereinafter, for simplicity of explanation, it is assumed that access is performed byte by byte and a data width of input/output data of a multiplexer, that is, a size of one data segment is 8 bits (one byte). Therefore, the following description is given on the assumption that the number of bytes (byte length) of data is equivalent to the number of data segments. The "multiplexer" may be referred to as a "MUX".

An arbitrary multiplexer can be realized by a combination of a plurality of 2:1-MUXs (2:1 multiplexers). The 2:1-MUX is a MUX having two inputs and one output. For example, as illustrated in FIG. 1A, the 2:1-MUX selectively switches and outputs any one of two data segments A and B as a single data segment X according to a control signal C from a control unit (not illustrated) or the like. In this case, the 2:1-MUX is controlled according to, for example, a truth table illustrated in FIG. 1B. That is, the 2:1-MUX outputs the data segment A when the control signal is 0, and outputs the data segment B when the control signal is 1. FIG. 1A is a view illustrating a basic configuration the 2:1-MUX and FIG. 1B is a view illustrating the truth table of the 2:1-MUX illustrated in FIG. 1A.

In general, the number of 2:1 MUXs and the number of stages of the 2:1 MUXs which are used to realize a p:1-MUX which selectively switches and outputs a single data segment from p data segments (p is an integer equal to or larger than 2) are respectively calculated by the following Formulas (1) and (2).

$$\text{Number of MUXs} = p-1 \quad (1)$$

$$\text{Number of stages of MUXs} = \lceil \log_2 p \rceil \quad (2)$$

where $\lceil X \rceil$ is a ceiling function, and when X is a real number, $\lceil X \rceil$ is a minimum integer equal to or larger than X.

For example, FIG. 2 is a view illustrating a 4:1-MUX configured by 2:1-MUXs, that is a view illustrating a configuration of a 2:1-MUX of a multiplexer circuit of p=4. The 4:1-MUX illustrated in FIG. 2 outputs any one of four data segments A1, A2, A3, and A4 as the single data segment X. As obvious from Formulas (1) and (2) or FIG. 2, the number of 2:1 MUXs and the number of stages of the 2:1 MUXs, which are used to realize the 4:1-MUX, are 3 and 2 respectively.

As described above, since the multiplexer is realized by the combination of the plurality of 2:1-MUXs, a circuit amount of a relevant multiplexer can be converted into the number of the 2:1-MUXs. As described below, in the present embodiment, a circuit amount of a first selection circuit and a second selection circuit (see reference numerals 34 and 35 in FIG. 4 or 10) in the multiplexer circuit that is the design target is converted into the number T of the 2:1-MUXs using circuit amount conversion formulae (6) and (14) described below.

As described with reference to FIG. 13 above, when large-volume data is processed in an LSI or the like, M-byte data is entirely stored in a register, and therefore, access is performed with respect to N-byte field data arranged at an arbitrary offset at a time (in one clock cycle).

Figure 3:
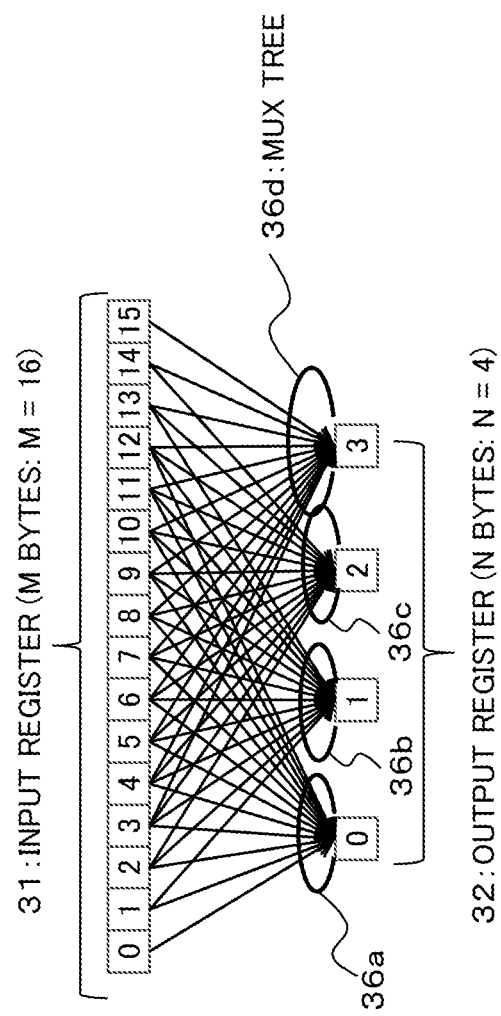
FIG. 3 is a view illustrating an example of a MUX tree that directly loads an N-byte data segment led by an arbitrary data segment from an M-byte data segment of an input register to an output register.

In FIG. 3, there is an examples in which MUX trees 36a to 36d which directly load the N data segments led by an arbitrary data segment from the input register (first register) 31 storing the M data segments to the output register (second register) 32. In particular, in FIG. 3, there is an example of M=16 and N=4. As illustrated in FIG. 3, the input register 31 includes input registers #0 to #15 which store 16 data segments respectively, and the output register 32 includes output registers #0 to #3 which store N data segments respectively loaded from the input register 31.

In this case, 4 MUX trees (selection circuits) 36a to 36d are formed between the input register 31 and the output register 32. That is, the MUX tree 36a is formed between the output register #0 and the 13 input registers #0 to #12, and the MUX tree 36b is formed between the output register #1 and the 13 input registers #1 to #13. Similarly, the MUX tree 36c is formed between the output register #2 and the 13 input registers #2 to #14, and the MUX tree 36d is formed between the output register #3 and the 13 input registers #3 to #15.

The number of 2:1 MUXs and the number of stages of 2:1 MUXs, which are used to realize the four MUX trees 36a to 36d illustrated in FIG. 3, are calculated by the following Formulas (3) and (4). That is, in the case of M=16 and N=4, in order to realize the MUX trees 36a to 36d, the number of 2:1 MUXs is 48 from the following formula (3) and the number of stages of 2:1 MUXs is 4 from the following formula (4).

$$\text{Number of MUXs} = N*(M-N) \quad (3)$$

$$\text{Number of stages of MUXs} = \lceil \log_2(M-N) \rceil \quad (4)$$

Therefore, in the MUX trees 36a to 36d which directly load data from the input register 31 to the output register 32, the number of used 2:1 MUXs is considerably large, and a circuit scale (circuit amount) of a multiplexer circuit increases.

Figure 4:
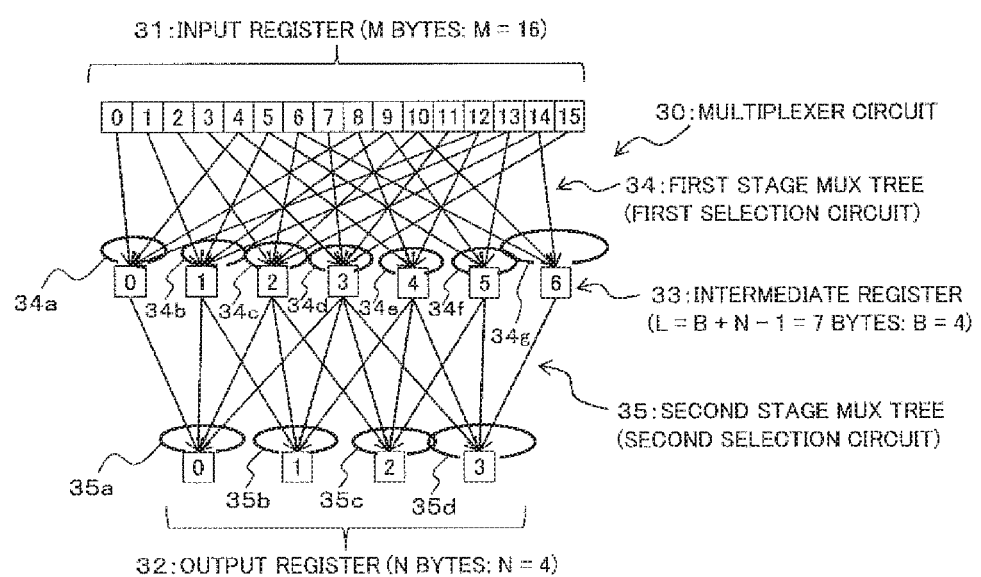
FIG. 4 is a view illustrating a configuration of a multiplexer circuit to be designed according to a first embodiment of the present invention.

In order to reduce the circuit amount of the multiplexer circuit, for the multiplexer circuit 30 according to a first embodiment described below, a configuration which indirectly loads data from the input register 31 to the output register 32 through an intermediate register 33 as illustrated in FIG. 4 is employed. FIG. 4 is a view illustrating a configuration of a multiplexer circuit 30 to be designed according to a first embodiment of the present invention.

As illustrated in FIG. 4, the multiplexer circuit 30 loads N data segments led by an arbitrary data segment from the first register 31 storing M data segments to the second register 32. That is, the multiplexer circuit 30 loads field data (partial data) of an N-byte length (N<M) to the output register 32 from an arbitrary offset in data of an M-byte length stored in the input register 31 at a time (that is, in one clock cycle). In FIG. 4, there is an example of M=16 and N=4.

The multiplexer circuit 30 illustrated in FIG. 4 includes the intermediate register 33, a first stage MUX tree 34 and a second stage MUX tree 35. The first stage MUX tree 34 is an example of a "first selection circuit." The second state MUX tree 35 is an example of a "second selection circuit."

The intermediate register (intermediate gate) 33 temporarily stores L data segments (data having an L-byte length) including the N data segments (L is an integer of N<L<M) among the M data segments, between the input register 31 and the output register 32.

The first selection circuit (first stage MUX tree) 34 selectively loads the L data segments among the M data segments from the input register 31 to the intermediate register 33. In particular, the first selection circuit 34 according to a first embodiment selectively loads and stores the L data segments led by a data segment for each predetermined number B (B≤N) from a beginning of the M data segments to the intermediate register 33. The data length L (value corresponding to a size of the intermediate register 33) of data stored in the intermediate register 33 is obtained by the following Formula (5).

$$L = N + B - 1 \quad (5)$$

where the predetermined number B is a parameter for determining a size L of the intermediate register 33, and in FIG. 4, there is an example of B=4 and L=7. Hereinafter, the predetermined number B may be referred to as an input/intermediate register interval B.

The second selection circuit (second stage MUX tree) 35 selectively loads the N data segments among the L data segments from the intermediate register 33 to the output register 32.

In the example illustrated in FIG. 4, the input register 31 includes input registers #0 to #15 respectively storing 16 data segments. Also, the intermediate register 33 includes intermediate registers #0 to #6 each storing L data segments loaded from the input register 31 by the first selection circuit 34. The output register 32 includes output registers #0 to #3 respectively storing N data segments loaded from the intermediate register 33 by the second selection circuit 35.

In the first stage MUX tree 34 between the input register 31 and the intermediate register 33, respective bytes (respective data segments) of the intermediate register 33 configure MUX trees 34a to 34g at a B-byte interval above the input register 31. That is, the MUX tree 34a is formed between the intermediate register #0 and the four input registers #0, #4, #8 and #12, and the MUX tree 34b is formed between the intermediate register #1 and the four input registers #1, #5, #9 and #13. Similarly, the MUX tree 34c is formed between the intermediate register #2 and the four input registers #2, #6, #10 and #14, and the MUX tree 34d is formed between the intermediate register #3 and the four input registers #3, #7, #11 and #15. Also, the MUX tree 34e is formed between the intermediate register #4 and the three input registers #4, #8 and #12, the MUX tree 34f is formed between the intermediate register #5 and the three input registers #5, #9 and #13, and the MUX tree 34g is formed the intermediate register #6 and the three input registers #6, #10 and #14.

Furthermore, the four MUX trees 35a to 35d are formed in a two-stage MUX tree 35 between the intermediate register 33 and the output register 32. That is, the MUX tree 35a is formed between the output register #0 and the four intermediate registers #0 to #3, and the MUX tree 35b is formed between the output register #1 and the four intermediate registers #1 to #4. Similarly, the MUX tree 35c is formed between the output register #2 and the four intermediate registers #2 to #5, and the MUX tree 35d is formed between the output register #3 and the four intermediate registers #3 to #6.

In the multiplexer circuit 30 illustrated in FIG. 4, data in any one of the following four sections of the input register 31 is stored in the intermediate register 33 by the function of the first stage-MUX tree 34. The data in the following section is data of a 7-byte length (=B+N−1) arranged at 4 (=B) bytes in the input register 31, data in a fourth section has only a 4-byte length.

[#0-#6], [#4-#10], [#8-#14], [#12-#15]

Therefore, consecutive arbitrary pieces of data of a 4-type length are read to the output register 32 by the function of the second stage MUX tree 35 in the intermediate register 33.

Data of a 4-byte length (=N) can be stored in the output register 32, from an arbitrary offset in the input register 31 by the above-described functions of the first stage MUX tree 34 and the second stage MUX tree 35.

In this case, the number of 2:1-MUXs used to realize the first stage MUX tree 34 illustrated in FIG. 4 is calculated using Formula (3) and is 18. In this case, the number of 2:1-MUXs used to realize the second stage MUX tree 34 illustrated in FIG. 4 is calculated using Formula (3) and is 12. Therefore, in the case of M=16, N=4, and B=4 (that is, L=7), the number of 2:1-MUXs used to realize the multiplexer circuit 30 is 18+12=30, thereby achieving remarkable reduction in number, compared with the number 48 in the example illustrated in FIG. 3.

[2] First Embodiment

According to the first embodiment, a method and apparatus will be described with reference to FIGS. 5 to 9, which calculate value of an input/intermediate register interval B for minimizing a circuit amount of the selection circuits 34 and 35 in the multiplexer circuit 30 having a configuration illustrated in FIG. 4 and design the selection circuits 34 and 35 based on the value B. In this case, a value M corresponding to a size of the input register 31 and a value N corresponding to a size of the output register 32 are given in advance, but a value of the input/intermediate register interval B, that is, a value of an L (=B+N−1) corresponding to a size of the intermediate register 33 is undetermined.

Figure 5:
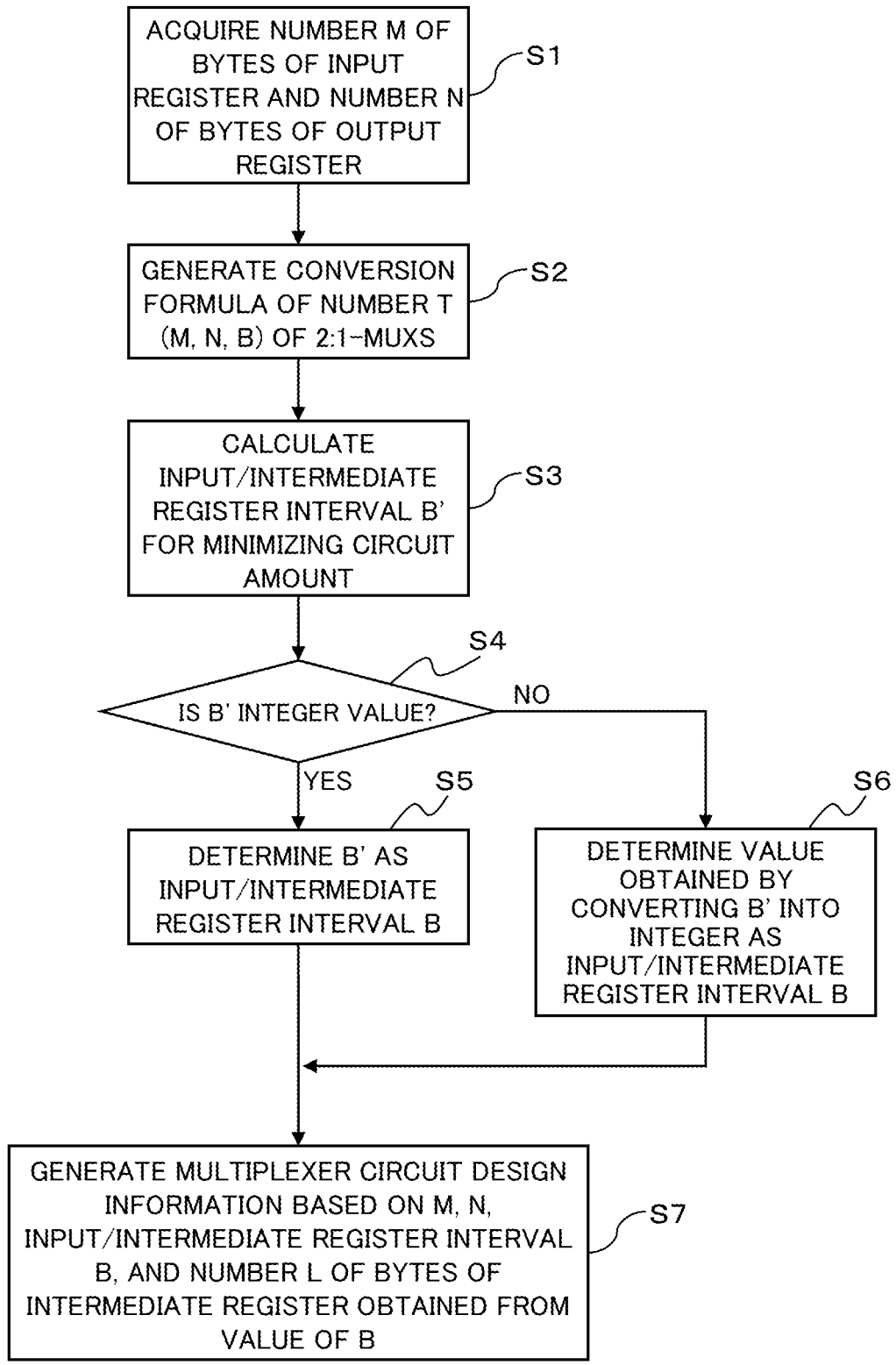
FIG. 5 is a flowchart illustrating a design process of designing the multiplexer circuit to be designed according to the first embodiment of the present invention.

According to a flowchart (steps S1 to S7) illustrated in FIG. 5, a design process of designing the multiplexer circuit 30 according to a first embodiment of the present invention will be described. The design process is performed by a processing unit (computer) 10 of a multiplexer circuit designing apparatus 1 which will be described with reference to FIG. 6 below.

According to the first embodiment, an optimal size L of the intermediate register 33 is calculated from the size M of the input register 31 and the size N of the output register 32, in the multiplexer circuit 30 having the configuration illustrated in FIG. 4. In practice, as described above, an optimal value of the input/intermediate register interval B for determining the optimal size L is calculated.

To this end, first, the size (number of input bytes) M of the input register 31 and the size (number of output bytes) N of the output register 32 are acquired (step S1). n this case, the sizes M and N may be acquired by reading those previously set and stored in the storage unit 20 (see FIG. 6) or may be acquired by receiving those input from an input device, such as a keyboard, by a designer or the like.

In a case where the number M of input bytes, the number N of output bytes, and the input/intermediate register interval B are taken as variables, a function T (M, N, B) of converting the circuit amount of the first stage MUX tree 34 and the second MUX tree 35 to the number of 2:1-MUXs is generated as the following Formula (6) (step S2).

$$T(M,N,B)=(N+B-1)*\lceil (M-N)/B \rceil +(N-1)*(B-1) \qquad (6)$$

where $\lceil X \rceil$ is a ceiling function, and when X is a real number, $\lceil X \rceil$ is a minimum integer equal to or larger than X.

Thereafter, the value B' of B for minimizing the value T(M, N, B) acquired by the conversion Formula (6) is calculated in the following Formula (7) (step S3). In general, the value B' is a real number.

$$B'=\min(N,\sqrt{M-N}) \qquad (7)$$

Whether the value B' acquired by Formula (7) is a real number is determined (step S4). When the value B' is a real number (YES route of step S4), the value B' is determined as the input/intermediate register interval B (step S5).

On the other hand, when the value B' acquired by Formula (7) is not a real number (No route of step S4), the value B' is converted to an integer and a value acquired by conversion to an integer is determined as the input/intermediate register interval B (step S6).

In this case, conversion of the value B' to an integer is performed by determining one of an integer k or k+1 satisfying the following Formula (8) as the value B. That is, the number T(M, N, k) of 2:1 MUXs and the number T(M, N, k+1) of 2:1 MUXs are acquired by respectively substituting k and k+1 as the value of the B into the conversion Formula (6). In the case of T (M, N, k)<T (M, N, k+1), the integer k is determined as the value of the B for minimizing the number of 2:1 MUXs, that is, the circuit amount of the first stage MUX tree 34 and the second stage MUX tree 35. Also, in the case of T (M, N, k+1)<T (M, N, k), the integer k+1 is determined as the value of the B for minimizing the number of 2:1 MUXs, that is, the circuit amount of the first stage MUX tree 34 and the second stage MUX tree 35.

$$k \leq \min(N,\sqrt{M-N}) \leq k+1 \ (k \text{ is an integer}) \qquad (8)$$

The size L=N+B−1 of the intermediate register 33 is acquired based on the input/intermediate register interval B determined in step S5 or S6. The multiplexer circuit 30 that is the design target is generated by using the obtained size L of the intermediate register 33, the obtained size M of the input register 31, and the obtained size N of the output register 32 (step S7).

Figure 6:
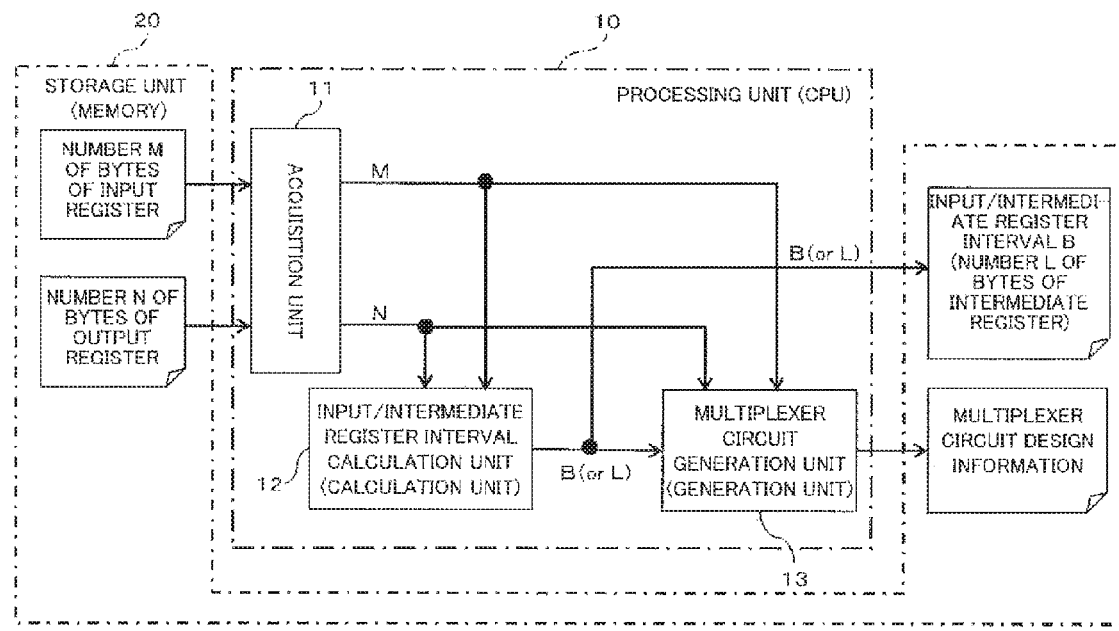
FIG. 6 is a block diagram illustrating a hardware configuration and a functional configuration of hardware of a multiplexer circuit designing apparatus which designs a multiplexer circuit according to the design process illustrated in FIG. 5.

Next, a hardware configuration and a functional configuration of a multiplexer circuit designing apparatus 1 which designs the multiplexer circuit 30 according to the design process illustrated in FIG. 5 will be described with reference to FIG. 6. FIG. 6 is a block diagram illustrating the hardware configuration and the functional configuration of the multiplexer circuit designing apparatus 1.

As illustrated in FIG. 6, the multiplexer circuit designing apparatus 1 is an apparatus for designing the multiplexer circuit 30 having the configuration illustrated in FIG. 4. The multiplexer circuit designing apparatus 1 includes at least, a processing unit 10, such as a central processing unit (CPU), a micro-processing unit (MPU), or a computer, and a storage unit 20, such as a random access memory (RAM), a hard disk drive (HDD), or a solid state device (SSD).

The processing unit 10 reads and executes a predetermined application program (multiplexer circuit designing program) from the storage unit 20, and functions as an acquisition unit 11, an input/intermediate register interval calculation unit 12, and a multiplexer circuit generation unit 13. The predetermined application program is provided in the form of being stored in a computer-readable recording medium such as a flexible disk, a CD (e.g., CD-ROM, CD-R, CD-RW), a DVD (e.g., DVD-ROM, DVD-RAM, DVD-R, DVD-RW, DVD+R, DVD+RW), or a blu-ray disk. In this case, the processing unit 10 reads a program from a relevant recoding medium, transmits the program to the storage unit 20 which is an internal storage device or an external storage device, stores the program in the storage unit 20, and uses the program.

The storage unit 20 stores not only the predetermined application program, but also various types of information used for processing by the processing unit 10. For example, the storage unit 20 stores, as the various types of information, the number M of bytes (size) of the input register 31 and the number of bytes (size) N of the output register 32 which are acquired by the acquisition unit 11 described below. Also, the storage unit 20 stores, as the various types of information, the input/intermediate register interval B (or the number L of bytes (size) of the intermediate register 33 acquired based on the interval B) acquired by the input/intermediate register interval calculation unit 12 described below. Furthermore, the storage unit 20 stores design information of the multiplexer circuit 30 generated by the multiplexer circuit generation unit 13 described below.

The functions of the acquisition unit 11, the input/intermediate register interval calculation unit 12, and the multiplexer circuit generation unit 13 which are realized by the processing unit 10 will be described corresponding to respective steps S1 to S7 of the flowchart illustrated in FIG. 5.

The acquisition unit 11 performs processing of the above-described step S1 and acquires the size (number of input bytes) M of the input register 31 and the size (number of output bytes) N of the output register 32. In this case, as described above, the acquisition unit 11 may read and acquire the sizes M and N previously set and stored in the storage unit 20 or may receive and acquire the sizes M and N input by a designer through an input device (not illustrated), such as a keyboard.

The input/intermediate register interval calculation unit (calculation unit) 12 performs processing of the above-described steps S2 to S6, and calculates a value of the input/intermediate register interval B for minimizing the circuit amount of the first stage MUX tree 34 and the second stage MUX tree 35 based on values of the sizes M and N. The input/intermediate register interval calculation unit 12 or the multiplexer circuit generation unit 13 determines a value of the size L (=N+B−1) of the intermediate register 33 based on the calculated value of the input/intermediate register interval B.

The input/intermediate register interval calculation unit 12 generates a function T (M, N, B) which converts the circuit amount of the first stage MUX tree 34 and the second stage MUX tree 35 to the number of 2:1 MUXs in accordance with the conversion Formula (6) (step S2). The input/intermediate register interval calculation unit 12 obtains the value B' of the B for minimizing the value T(M, N, B) acquired by the conversion Formula (6) is obtained by Formula (7) (step S3).

Also, the input/intermediate register interval calculation unit 12 determines whether the value B' obtained by Formula (7) is an integer (step S4). When it is determined that the value B' is an integer, the input/intermediate register interval calculation unit 12 determines the value B' as the input/intermediate register interval B (step S5).

On the other hand, when it is determined that the value B' obtained by Formula (7) is not an integer, the input/intermediate register interval calculation unit 12 converts the value B' to an integer and determines a value obtained by converting the value B' into the integer, as the input/intermediate register interval B (step S6). In this case, as described above, the conversion of the value B' to an integer is performed by determining one of an integer k or k+1 satisfying Formula (8) as the value B.

The multiplexer circuit generation unit 13 performs processing of the above-described step S7, and determines the size L=N+B−1 of the intermediate register 33 based on the input/intermediate register interval B. The multiplexer circuit generation unit 13 performs generation of design information of the multiplexer circuit 30 (MUX trees 34 and 35) that is the design target by using the size L of the intermediate register 33, the size M of the input register 31, and the size N of the output register 32.

Figure 7:
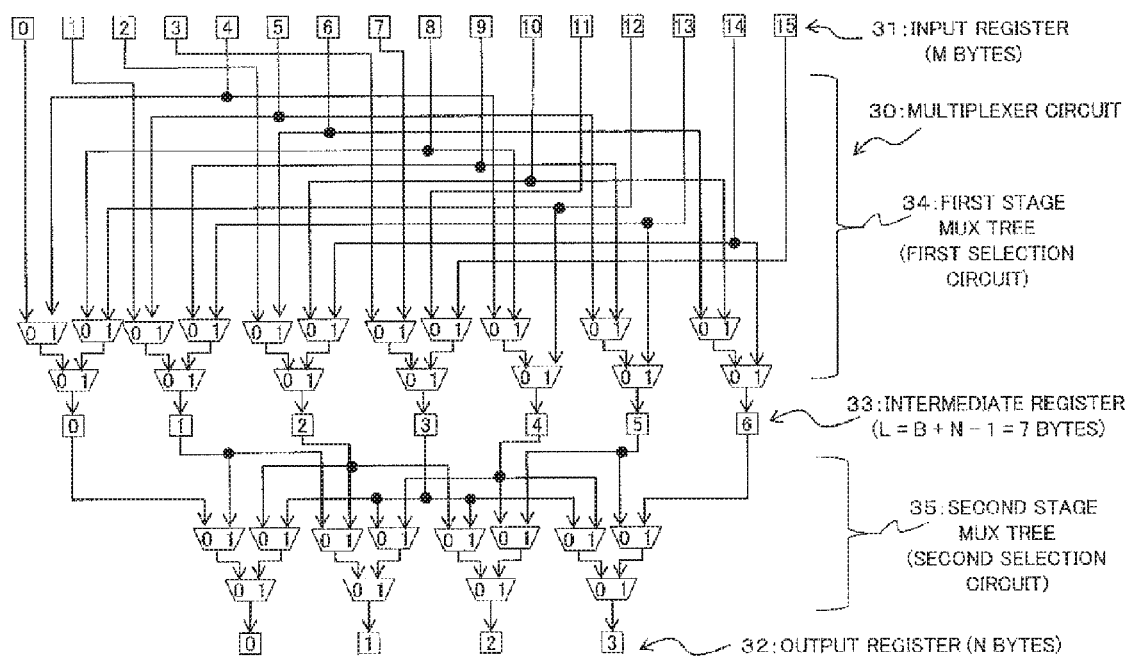
FIG. 7 is a view illustrating an example of a multiplexer circuit generated and designed by the multiplexer circuit designing apparatus illustrated in FIG. 6.

In the multiplexer circuit 30 where, for example, M=16 and N=4, as illustrated in FIG. 7, B=4 is obtained, and L=4+4−1=7 is obtained as the size L of the intermediate register 33. The first stage MUX tree 34 is constructed by 18 2:1-MUX trees and the second stage MUX tree 35 is constructed by 12 2:1-MUX trees. Also, FIG. 7 is a view illustrating an example of the multiplexer circuit 30 generated and designed by the multiplexer circuit designing apparatus 1 illustrated in FIG. 6.

According to a first embodiment, there is disposed the intermediate register 33 of the size L for minimizing the circuit amount (value by conversion to the number of 2:1-MUXs) of the input register 31 and the output register 32, between the input register 31 storing large-volume data and the output register 32 storing partial data. Thus, the multiplexer circuit 30 of which the circuit amount is considerably reduced is generated and designed. That is, the circuit amount of the multiplexer circuit 30 capable of performing random access with respect to large-volume data is considerably reduced.

Figure 8:
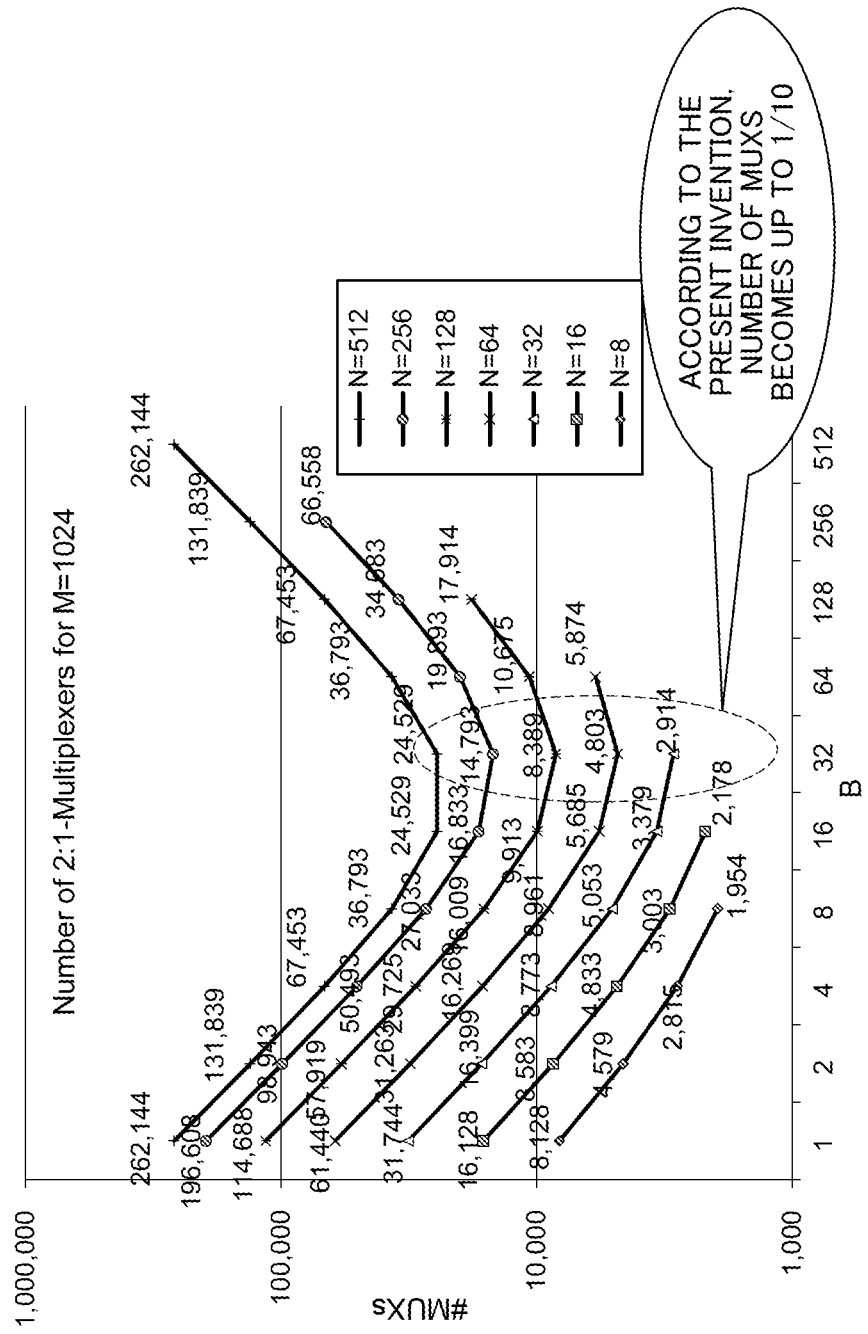
FIG. 8 is a graph illustrating a relationship between an input/intermediate register interval B and the number of 2:1 multiplexers.

Effects of reduction in the circuit amount based on the number of 2:1-MUXs according to the first embodiment are illustrated in FIG. 8. FIG. 8 is a graph illustrating a relationship between the input/intermediate register interval B and the number of 2:1-MUXs. The graph illustrated in FIG. 8 represents the relationship between the input/intermediate register interval B and the number of 2:1 multiplexers in the case of M=1024 and N=8, 16, 32, 64, 128, 256 and 512. As illustrated in FIG. 8, in the case of N=64 or more, the value of the B for minimizing the number of 2:1-MUXs is not obvious and an optimal value of the B is necessarily determined according to the process described in the first embodiment.

Figure 9:
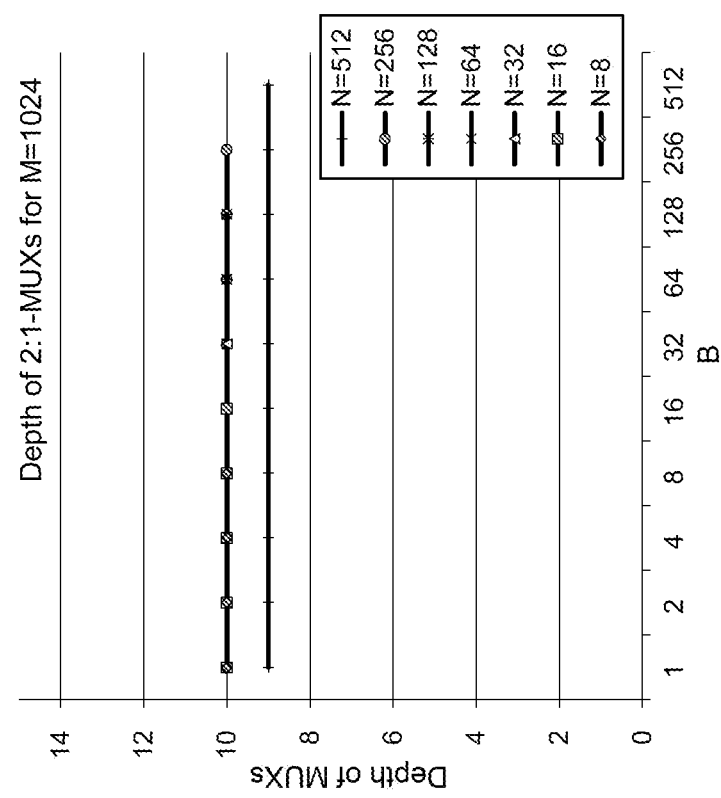
FIG. 9 is a graph illustrating a relationship between an input/intermediate register interval B and the number of stages of 2:1 multiplexers.

FIG. 9 is a graph illustrating a relationship between the input/intermediate register interval B and the number of stages of 2:1-MUXs. The graph illustrated in FIG. 9 represents the relationship between the input/intermediate register interval B and the number of stages of 2:1 multiplexers in the case of M=1024 and N=8, 16, 32, 64, 128, 256 and 512. The number of stages of MUX trees in the multiplexer circuit 30 having the configuration illustrated in FIG. 4 or 7 is calculated by adding the number of stages of the first stage MUX tree 34 and the number of stages of the second stage MUX tree 35 as the following formula (9). The approximate formula of the following formula (9) is given as the following formula (10).

$$\text{Number of stages of MUXs} = \lceil \log_2(M-N)/B \rceil + \lceil \log_2 5 \rceil \quad (9)$$

$$\text{Number of stages of MUXs} = \lceil \log_2(M-N) \rceil \quad (10)$$

The number of stages of 2:1-MUXs calculated by Formula (10) with respect to the multiplexer circuit 30 of the first embodiment is equal to the number of stages of 2:1-MUXs calculated by Formula (4) with respect to the multiplexer circuit having the configuration illustrated in FIG. 3. Also, as illustrated in FIG. 9, the number of stages of 2:1-MUXs is 9 to 10 without depending on the value of the B, and the multiplexer circuit 30 of the first embodiment is realized to have the same number of stages as the multiplexer circuit having the configuration illustrated in FIG. 3. That is, the processing speed of the multiplexer circuit 30 of the first embodiment is the same as the processing speed of the multiplexer circuit having the configuration illustrated in FIG. 3. Therefore, the speed performance of the multiplexer circuit 30 of the first embodiment is the same as the speed performance of the multiplexer circuit having the configuration illustrated in FIG. 3.

[3] [Second Embodiment]

Figure 10:
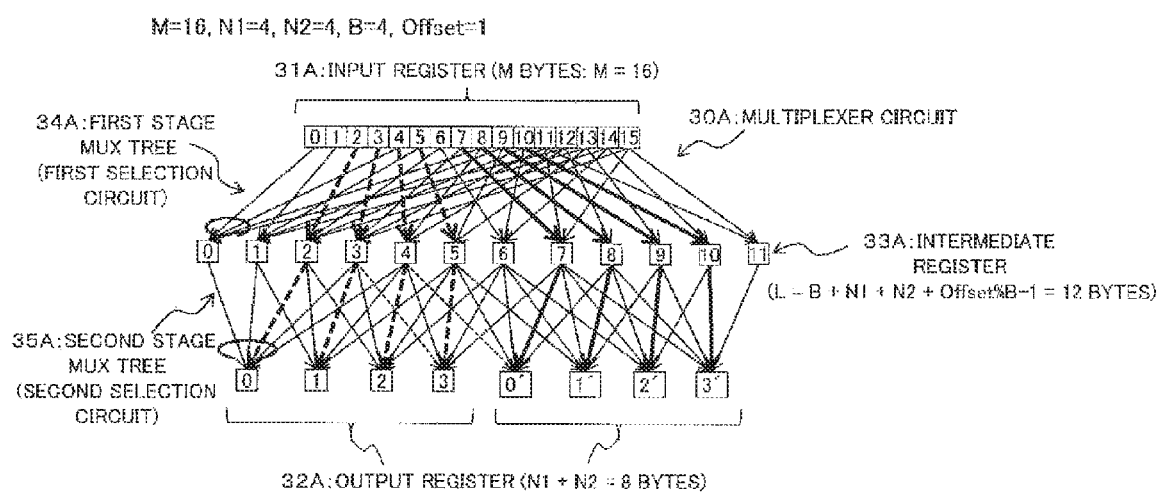
FIG. 10 is a view illustrating a configuration of a multiplexer circuit to be designed according to a second embodiment of the present invention.

Next, the second embodiment will be described in a manner to expand the first embodiment. As illustrated in FIG. 10, in the multiplexer circuit 30A according to the second embodiment, a configuration of indirectly loading data from an input register 31A to an output register 32A through an intermediate register 33A is employed. FIG. 10 is a view illustrating a configuration of a multiplexer circuit 30A to be designed according to a second embodiment of the present invention.

As illustrated in FIG. 10, the multiplexer circuit 30A loads N1 data segments led by a first arbitrary data segment and N2 data segments led by a second arbitrary data segment from the first register 31A storing M data segments to the second register 32A. When N1 is an integer of N1<M and N2 is an integer of N2<M, the size of the second register 32A is N1+N2 bytes. That is, the multiplexer circuit 30A loads field data (partial data) of an N1-byte length and an N2-byte length from an arbitrary offset to the output register 32A in data of an M-byte length stored in the input register 31A simultaneously (that is, in one clock cycle). In FIG. 10, there is an example of M=16, N1=4, N2=4, and Offset=1. Offset is a constant (0≤Offset≤M−N1−N2) representing an arrangement interval on the input register 31A between the N1 data segments and the N2 data segments.

The multiplexer circuit 30A illustrated in FIG. 10 includes the intermediate register 33A, a first stage MUX tree 34A and a second stage MUX tree 35A. The first stage MUX tree 34A is an example of the "first selection circuit." The second state MUX tree 35A is an example of the "second selection circuit."

The intermediate register (intermediate gate) 33A temporarily stores L data segments (data of an L-byte length)

including the N1 data segments and the N2 data segments among the M data segments, between the input register 31A and the output register 32A. L is an integer of N1+N2<L<M.

The first selection circuit (first stage MUX tree) 34A selectively loads the L data segments among the M data segments from the input register 31A to the intermediate register 33A. In particular, the first selection circuit 34A according to a second embodiment selectively loads and stores the L data segments led by a data segment for each predetermined number B (B≤N1 or B≤N2) from a beginning of the M data segments to the intermediate register 33A. The data length L (value corresponding to a size of the intermediate register 33A) of data stored in the intermediate register 33A is obtained by the following Formula (11). Where the predetermined number (input/intermediate register interval) B is a parameter for determining a size L of the intermediate register 33A, and in FIG. 10, there is an example of B=4 and L=12.

$$L=B+N1+N2+\text{Offset} \% B-1 \qquad (11)$$

where Offset % B is a reminder acquired by dividing a value of Offset by a value of B.

The second selection circuit (second MUX tree) 35A loads the N1 data segments and the N2 data segments among the L data segments from the intermediate register 33A to the output register 32A.

In the example illustrated in FIG. 10, the input register 31A includes input registers #0 to #15 respectively storing 16 data segments. Also, the intermediate register 33A includes intermediate registers #0 to #11 respectively storing the L data segments loaded from the input register 31A by the first selection circuit 34A. The output register 32A includes output registers #0 to #3 and #0' to #3' respectively storing N1+N2 data segments loaded from the intermediate register 33A by the second selection circuit 35A. The output registers #0 to #3 store the N1 data segments of the former half, and the output registers #0' to #3' store the N2 data segments of the latter half.

In the first stage MUX tree 34A between the input register 31A and the intermediate register 33A, respective bytes (respective data segments) of the intermediate register 33A configure MUX trees at a B-byte interval above the input register 31A. That is, the MUX tree is formed between the intermediate register #0 and the four input registers #0, #4, #8 and #12, and the MUX tree is formed between the intermediate register #1 and the four input registers #1, #5, #9 and #13. Similarly, the MUX tree is formed between the intermediate register #2 and the four input registers #2, #6, #10 and #14, and the MUX tree is formed between the intermediate register #3 and the four input registers #3, #7, #11 and #15. Also, the MUX tree is formed between the intermediate register #4 and the three input registers #4, #8 and #12, the MUX tree is formed between the intermediate register #5 and the three input registers #5, #9 and #13, the MUX tree is formed the intermediate register #6 and the three input registers #6, #10 and #14, and the MUX tree is formed the intermediate register #7 and the three input registers #7, #11 and #15. Also, the MUX tree is formed between the intermediate register #8 and the two input registers #8 and #12, the MUX tree is formed between the intermediate register #9 and the two input registers #9 and #13, the MUX tree is formed the intermediate register #10 and the two input registers #10 and #14, and the MUX tree is formed the intermediate register #11 and the two input registers #11 and #15.

Furthermore, the eight MUX trees are formed in a two-stage MUX tree 35A between the intermediate register 33A and the output register 32A. That is, the MUX tree is formed between the output register #0 and the five intermediate registers #0 to #4, and the MUX tree is formed between the output register #1 and the five intermediate registers #1 to #5. Also, the MUX tree is formed between the output register #2 and the five input registers #2 to #6, and the MUX tree is formed between the output register #3 and the five input registers #3 to #7. Similarly, the MUX tree is formed between the output register #0' and the five intermediate registers #4 to #8, and the MUX tree is formed between the output register #1' and the five intermediate registers #5 to #9. Also, the MUX tree is formed between the output register #2' and the five input registers #6 to #10, and the MUX tree is formed between the output register #3' and the five input registers #7 to #11.

In the multiplexer circuit 30A illustrated in FIG. 10, data in any one of the following four sections of the input register 31A is stored in the intermediate register #0 to #6 by the function of the first stage-MUX tree 34A, in the N1 data segments of the former half.

[#0-#6], [#4-#10], [#8-#14], [#12-#15]

In the multiplexer circuit 30A illustrated in FIG. 10, data in any one of the following two sections of the input register 31A is stored in the intermediate register #6 to #11 by the function of the first stage-MUX tree 34A, in the N2 data segments of the latter half.

[#6-#11], [#10-#15]

Two sets of 4-byte data of the intermediate register 33A are read to the registers #0 to #3 of the former half and the registers #0' to #3' of the latter half of the output register 32A by the function of the second stage MUX tree 35A.

By functions of the first stage MUX tree 34A and the second stage MUX tree 35A, it is possible to store, in the output register 32A, data of an N1-byte length and data of an N2-byte length from an arbitrary offset in the input register 31 with a predetermined interval Offset being placed after the data of the N1-byte length.

In FIG. 10, an example in which data segments of the input registers #2 to #5 and data segments of the input registers #7 to #10 are respectively output to the output registers #0 to #3 and the output registers #0' to #3' through the intermediate register 33A is illustrated by using thick dotted arrows and thick solid arrows. Also, the N1 data segments and the N2 data segments which are respectively loaded to the output registers #0 to #3 and the output registers #0' to #3' are changed by switching values of control signals C (see FIGS. 1A and 1B) with respect to respective 2:1-MUXs constituting the first stage MUX tree 34A and the second stage MUX tree 35A.

In the second embodiment, there will be described, a method and apparatus for calculating a value of an input/intermediate register interval B for minimizing a circuit amount of the selection circuits 34A and 35A in the multiplexer circuit 30A having a configuration illustrated in FIG. 10 and designing the selection circuits 34A and 35A based on the value B. In this case, a value M corresponding to a size of the input register 31A, a value N corresponding to a size of the output register 32A, and a constant Offset representing an arrangement interval are given in advance, but a value of the input/intermediate register interval B, that is, a value of an L (=B+N1+N2+Offset % B−1) corresponding to a size of the intermediate register 33A is undetermined.

According to a flowchart (steps S11 to S14) illustrated in FIG. 11, a design process of designing the multiplexer circuit 30A according to a second embodiment of the present invention will be described. The design process is performed also by a processing unit (computer) 10 of a multiplexer circuit designing apparatus 1 which is described with reference to FIG. 6 above.

According to the second embodiment, an optimal size L of the intermediate register 33A is calculated from the size M of the input register 31A, the size N1 and N2 of data to be loaded to the output register 32A and the constant Offset, in the multiplexer circuit 30A having the configuration illustrated in FIG. 10. In practice, as described above, an optimal value of the input/intermediate register interval B for determining the optimal size L is calculated.

To this end, first, the size M (number of input bytes) of the input register 31A, the size N1 and N2 of the data to be loaded to the output register 32, and the constant Offset are acquired (step S11). In this case, the sizes M, N1, N2, and the constant Offset may be acquired by reading those previously set and stored in the storage unit 20 (see FIG. 6) or may be acquired by receiving those input from an input device, such as a keyboard, by a designer or the like.

In a case where the number M of input bytes, the number N1, N2 of output bytes, the constant Offset, and the input/intermediate register interval B are taken as variables, a function T (M, N1, N2, Offset, B) of converting the circuit amount of the first stage MUX tree 34A and the second MUX tree 35A to the number of 2:1-MUXs is generated as follows (step S12).

The number of 2:1-MUXs (number of first stage MUXs) which realize the first stage MUX tree 34A is calculated by the following formula (12).

$$\text{number of first stage } MUXs = (N1 + N2 + \text{Offset} \% B + B - 1) * \left\lceil \frac{(M - (N1 + N2 + \text{Offset} \% B))}{B} \right\rceil - (B - 1) \quad (12)$$

Also, the number of 2:1-MUXs (number of second stage MUXs) which realize the second stage MUX tree 35A is calculated by the following formula (13).

$$\text{Number of second stage MUXs} = (N1+N2)*(B-1) \quad (13)$$

Therefore, the function T (M, N1, N2, Offset, B) of converting the circuit amount of the first stage MUX tree 34A and the second stage MUX tree 35A to the number of 2:1-MUXs is given as the following conversion formula (14) by adding Formula (12) and Formula (13).

$$T(M, N1, N2, \text{Offset}, B) = (N1 + N2 + \text{Offset} \% B + B - 1) * \left\lceil \frac{\{M - (N1 + N2 + \text{Offset} \% B)\}}{B} \right\rceil + (N1 + N2 - 1)*(B - 1) \quad (14)$$

Thereafter, the value of the B for minimizing the value T (M, N1, N2, Offset, B) obtained by the conversion formula (14) is calculated (step S13). In this case, an integer which minimizes the number T (M, N1, N2, Offset, B) of the 2:1-MUXs, which is obtained by substituting the integer among integers within a range of $1 \leq B \leq N1+N2+\text{Offset}$ into the circuit amount conversion formula (14) is determined as the value of the B.

The size L=B+N1+N2+Offset % B−1 of the intermediate register 33A is acquired based on the input/intermediate register interval B determined in step S13. The multiplexer circuit 30A that is the design target is generated by using the size L of the intermediate register 33A, the size M of the input register 31A, and the size N1+N2 of the output register 32A, which are obtained (step S14).

Figure 11:
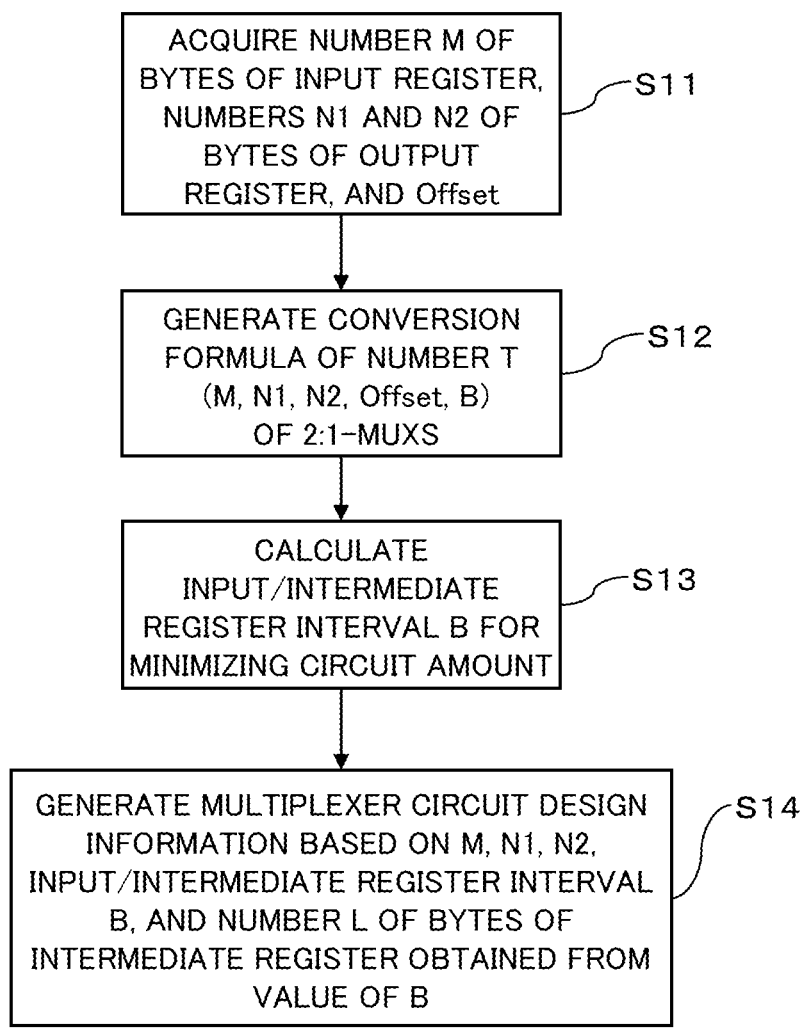
FIG. 11 is a flowchart illustrating a design process of designing the multiplexer circuit to be designed according to the second embodiment of the present invention.

The multiplexer circuit designing apparatus 1, which designs the multiplexer circuit 30A according to the design process illustrated in FIG. 11, is configured similarly to the hardware configuration and the functional configuration of the multiplexer circuit designing apparatus 1 of the first embodiment illustrated in FIG. 6. The processing of step S11 as described above is performed by the acquisition unit 11 in the similar manner to the first embodiment. Also, the processing of steps S12 and S13 as described above is performed by the input/intermediate register interval calculation unit 12. The processing of step S14 as described above is performed by the multiplexer circuit generation unit 13.

According to the second embodiment, the intermediate register 33A of the size L for minimizing the circuit amount (value converted to the number of 2:1-MUXs) between the registers 31A and 32A, is disposed between the input register 31A storing large-volume data and the output register 32A storing two sets of partial data, as in the first embodiment. Thus, the multiplexer circuit 30A of which the circuit amount is considerably reduced is generated and designed. That is, the circuit amount of the multiplexer circuit 30A capable of performing random access with respect to large-volume data is considerably reduced. In particular, according to the second embodiment, the data of the N1-byte length and the data of the N2-byte length can be stored in the output register 32A from the arbitrary offset in the input register 31 with a predetermined interval Offset being placed after the data of N1-byte length.

[4] Others

While preferred embodiments have been described in detail above, the present invention is not limited to the specific embodiments but may be variously modified and changed to be embodied without departing from the gist of the present invention.

Although the data width of one data segment is described as being 8 bits (1 byte) in the above embodiments, the present invention is not limited thereto. Similarly, although the case of M=16, N=N1=N2=4, and Offset=1 is described in the above embodiments, the present invention is not limited thereto.

Also, in the above embodiments, there has been cases in which the technology of the present invention is applied to the multiplexer circuits 30 and 30A which perform loading of data from the input registers 31 and 31A to the output registers 32 and 32A. On the contrary, the technology of the present invention can be also applied to a circuit that performs loading of data from the output register 32 or 32A to the input register 31 or 31A, so that the same effects as the above-described embodiment can be achieved.

According to the embodiments, the circuit amount of a multiplexer circuit capable of performing random access with respect to large-volume data is considerably reduced.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A multiplexer circuit which loads N data segments (N is an integer of N<M) led by one of M data segments (M is an integer equal to or larger than two) from a first register storing the M data segments to a second register, the multiplexer circuit comprising:

an intermediate register interposed between the first register and the second register and configured to temporarily store L data segments (L is an integer of N<L<M) including the N data segments among the M data segments;

a first selection circuit including a plurality of 2:1 multiplexers each of which selectively switches and outputs one data segment from two data segments, and configured to cause each of the 2:1 multiplexers in the first selection circuit to selectively switch and output the data segment to load the L data segments among the M data segments from the first register to the intermediate register; and a second selection circuit including a plurality of 2:1 multiplexers each of which selectively switches and outputs one data segment from two data segments, and configured to cause each of the 2:1 multiplexers in the first selection circuit to selectively switch and output the data segment to load the N data segments among the L data segments from the intermediate register to the second register, wherein the first selection circuit and the second selection circuit are designed based on a value of L for minimizing a circuit amount of the first selection circuit and the second selection circuit, which is calculated according to values of the M and the N.

2. The multiplexer circuit according to claim 1, wherein the first selection circuit loads and stores the L data segments (L=N+B−1) led by a data segment for each predetermined number B (B≤N) of data segments from a beginning of the M data segments, to the intermediate register.

3. The multiplexer circuit according to claim 2, wherein the circuit amount of the first selection circuit and the second selection circuit is converted by a number T (M, N, B) of 2:1 multiplexers each of which selectively switches and outputs one data segment from two data segments, based on the values of the M, the N, and the B, and the following circuit amount conversion formula (15), and the value of the B for minimizing the number T (M, N, B) of the 2:1 multiplexers converted by the following circuit amount conversion formula (15) is determined as an integer k or k+1 satisfying the following formula (16):

$$T(M,N,B)=(N+B-1)*\lceil(M-N)/B\rceil+(N-1)*(B-1) \quad (15)$$

where $\lceil X \rceil$ is a ceiling function, and
when X is a real number, $\lceil X \rceil$ is a minimum integer equal to or larger than X, $$k \leq \min(N, \sqrt{M-N}) \leq k+1 \ (k \text{ is an integer}) \quad (16).$$

4. The multiplexer circuit according to claim 3, wherein one of the k and the k+1 which minimizes the number T (M, N, B) of the 2:1 multiplexers, the number T (M, N, B) being acquired by respectively substituting the k and the k+1 as the value of the B into the circuit amount conversion formula (15), is determined as the value of the B for minimizing the number of the 2:1 multiplexers.

5. The multiplexer circuit according to claim 1, wherein the N data segments are N1 data segments (N1 is an integer of N1<M) led by a first arbitrary data segment and N2 data segments (N2 is an integer of N2<M) led by a second arbitrary data segment, the intermediate register temporarily stores the L data segments (L is an integer of N1+N2<L<M) including the N1 data segments and the N2 data segments among the M data segments, between the first register and the second register, the first selection circuit selectively loads the L data segments among the M data segments from the first register to the intermediate register, the second selection circuit selectively loads the N1 data segments and the N2 data segments among the L data segments from the intermediate register to the second register, and the first selection circuit and the second selection circuit are designed based on a value of L for minimizing a circuit amount of the first selection circuit and the second selection circuit, which is calculated according to values of the M, the N1, and the N2.

6. The multiplexer circuit according to claim 5, wherein the first selection circuit loads and stores the L data segments (a value of the L is determined by the following formula (17)) led by a data segment for each predetermined number B (B≤N1 and B≤N2) of data segments from a beginning of the M data segments, to the intermediate register:

$$L=B+N1+N2+\text{Offset} \% B-1 \quad (17)$$

where, Offset is a constant (0≤Offset≤M−N1−N2) representing an arrangement interval on the first register between the N1 data segments and the N2 data segments, and Offset % B is a reminder acquired by dividing a value of Offset by a value of B.

7. The multiplexer circuit according to claim 6, wherein the circuit amount of the first selection circuit and the second selection circuit is converted by a number T (M, N1, N2, Offset, B) of 2:1 multiplexers which selectively switch and output one data segment from two data segments, based on values of the M, the N1, the N2, the Offset, and the B, and the following circuit amount convert formula (18), and the value B for minimizing the number of the 2:1 multiplexers converted by the following circuit amount formula (18) is calculated:

$$T(M, N1, N2, \text{Offset}, B) = (N1 + N2 + \text{Offset} \% B + B - 1) * \left\lceil \frac{\{M - (N1 + N2 + \text{Offset} \% B)\}}{B} \right\rceil + (N1 + N2 - 1)*(B - 1) \quad (18)$$

where $\lceil X \rceil$ is a ceiling function, and
when X is a real number, $\lceil X \rceil$ is a minimum integer equal to or larger than X.

8. The multiplexer circuit according to claim 7, wherein an integer for minimizing the number T (M, N1, N2, Offset, B) of the 2:1 multiplexers, which is acquired by substituting the integer among integers within a range of 1≤B≤N1+N2+Offset into the circuit amount conversion Formula (18), is determined as the value of the B.

9. A computer-readable recording medium having stored therein a program for causing a computer to execute a process for designing a multiplexer circuit which loads N data segments (N is an integer of N<M) led by one of M data segments (M is an integer equal to or larger than two) from a first register storing the M data segments to a second register, the process comprising:

generating design information of the multiplexer circuit, the multiplexer circuit including
an intermediate register configured to temporarily store L data segments (L is an integer of N<L<M) including the N data segments among the M data segments, between the first register and the second register,
a first selection circuit configured to selectively load the L data segments among the M data segments from the first register to the intermediate register, and
a second selection circuit configured to selectively load the N data segments among the L data segments from the intermediate register to the second register; and
storing the generated design information to a storage unit,
wherein the generating of the design information includes:
acquiring values of the M and the N;
calculating a value of the L for minimizing a circuit amount of the first selection circuit and the second selection circuit based on the values of the M and the N; and
generating the first selection circuit and the second selection circuit based on the calculated value of the L,
wherein the first selection circuit loads and stores the L data segments (L=N+B−1) led by a data segment for each predetermined number B (B≤N) of data segments from a beginning of the M data segments, to the intermediate register.

10. The computer-readable recording medium according to claim 9, wherein the process further comprises:
converting the circuit amount of the first selection circuit and the second selection circuit by a number T (M, N, B) of 2:1 multiplexers each of which selectively switches and outputs one data segment from two data segments, based on the values of the M, the N, and the B, and the following circuit amount conversion formula (19), and
determining the value of the B for minimizing the number T (M, N, B) of the 2:1 multiplexers, which is converted by the following circuit amount conversion formula (19), as an integer k or k+1 satisfying the following formula (20):

$$T(M,N,B)=(N+B-1)*\lceil (M-N)/B \rceil + (N-1)*(B-1) \quad (19)$$

where $\lceil X \rceil$ is a ceiling function, and
when X is a real number, $\lceil X \rceil$ is a minimum integer equal to or larger than X, $$k \leq \min(N, \sqrt{M-N}) \leq k+1 \ (k \text{ is an integer}) \quad (20).$$

11. The computer-readable recording medium according to claim 9, wherein the process further comprises determining, as the value of the B for minimizing the number of the 2:1 multiplexer, one of the k or the k+1 which minimizes the number T (M, N, B) of the 2:1 multiplexers, the number T (M, N, B) being acquired by respectively substituting the k and the k+1 as the value of the B into the circuit amount conversion formula (19).

12. The computer-readable recording medium according to claim 9, wherein, the N data segments are N1 data segments (N1 is an integer of N1<M) led by a first arbitrary data segment and N2 data segments (N2 is an integer of N2<M) led by a second arbitrary data segment, and
in the multiplexer circuit including, the intermediate register temporarily stores the L data segments (L is an integer of N1+N2<L<M) including the N1 data segments and the N2 data segments among the M data segments, between the first register and the second register; the first selection circuit selectively loads the L data segments among the M data segments from the first register to the intermediate register; and the second selection circuit selectively loads the N1 data segments and the N2 data segments among the L data segments from the intermediate register to the second register,
wherein the process further comprising:
acquiring values of the M, the N1, and the N2;
calculating a value of the L for minimizing a circuit amount of the first selection circuit and the second selection circuit based on the values of the M, the N1, and the N2; and
generating the first selection circuit and the second selection circuit based on the calculated value of the L.

13. The computer-readable recording medium according to claim 12, wherein the first selection circuit loads and stores the L data segments (a value of the L is determined by the following formula (21)) led by a data segment for each predetermined number B (B≤N1 and B≤N2) of data segments from a beginning of the M data segments, to the intermediate register:

$$L = B + N1 + N2 + \text{Offset} \ \% \ B - 1 \quad (21)$$

where, Offset is a constant (0≤Offset≤M−N1−N2) representing an arrangement interval on the first register between the N1 data segments and the N2 data segments, and Offset % B is a reminder acquired by dividing a value of Offset by a value of B.

14. The computer-readable recording medium according to claim 13, wherein the process further comprises:
converting the circuit amount of the first selection circuit and the second selection circuit by a number T (M, N1, N2, Offset, B) of 2:1 multiplexers which selectively switch and output one data segment from two data segments, based on values of the M, the N1, the N2, the Offset, and the B, and the following circuit amount convert formula (22), and
calculating the value B for minimizing the number of the 2:1 multiplexers that is converted by the following circuit amount formula (22):

$$T(M, N1, N2, \text{Offset}, B) = (N1 + N2 + \text{Offset} \ \% \ B + B - 1) * \left\lceil \frac{\{M - (N1 + N2 + \text{Offset} \ \% \ B)\}}{B} \right\rceil + (N1 + N2 - 1)*(B-1) \quad (22)$$

where $\lceil X \rceil$ is a ceiling function, and
when X is a real number, $\lceil X \rceil$ is a minimum integer equal to or larger than X.

15. The computer-readable recording medium according to claim 14, wherein the process further comprises determining, as a value of the B, an integer for minimizing the number T (M, N1, N2, Offset, B) of the 2:1 multiplexers, which is acquired by substituting the integer among integers within a range of 1≤B≤N1+N2+Offset into the circuit amount conversion Formula (22).

16. An apparatus for designing a multiplexer circuit which loads N data segments (N is an integer of N<M) led by one of data segments (M is an integer equal to or larger than two) from a first register storing the M data segments to a second register, the apparatus comprising a processor configured to:
generating design information of the multiplexer circuit, the multiplexer circuit including
an intermediate register configured to temporarily store L data segments (L is an integer of N<L<M) including the N data segments among the M data segments, between the first register and the second register, a first selection circuit configured to selectively load the L data segments among the M data segments from the first register to the intermediate register, and a second selection circuit configured to selectively load the N data segments among the L data segments from the intermediate register to the second register; and storing the generated design information to a storage unit, wherein the generating of the design information includes:

acquiring values of the M and the N;

calculating a value of the L for minimizing a circuit amount of the first selection circuit and the second selection circuit based on the values of the M and the N; and generating the first selection circuit and the second selection circuit based on the calculated value of the L, wherein the first selection circuit loads and stores the L data segments (L=N+B−1) led by a data segment for each predetermined number B (B≤N) of data segments from a beginning of the M data segments, to the intermediate register.

17. The apparatus according to claim 16, wherein the calculating includes converting the circuit amount of the first selection circuit and the second selection circuit by a number T (M, N, B) of 2:1 multiplexers each of which selectively switches and outputs one data segment from two data segments, based on the values of the M, the N, and the B, and the following circuit amount conversion formula (23), and determining the value of the B for minimizing the number T (M, N, B) of the 2:1 multiplexers, which is converted by the following circuit amount conversion formula (23), as an integer k or k+1 satisfying the following formula (24):

$$T(M,N,B)=(N+B-1)*\lceil (M-N)/B \rceil +(N-1)*(B-1) \qquad (23)$$

where $\lceil X \rceil$ is a ceiling function, and when X is a real number, $\lceil X \rceil$ is a minimum integer equal to or larger than X, $$k \leq \min(N, \sqrt{M-N}) \leq k+1 \, (k \text{ is an integer}) \qquad (24).$$

18. The apparatus according to claim 17, wherein the calculating includes determining one of the k and the k+1 which minimizes the number T (M, N, B) of the 2:1 multiplexers, the number T (M, N, B) being acquired by respectively substituting the k and the k +1 as the value of the B into the circuit amount conversion formula (23), as the value of the B for minimizing the number of the 2:1 multiplexers.

* * * * *